United States Patent [19]

Saiki et al.

[11] 3,864,303
[45] Feb. 4, 1975

[54] METHOD OF MANUFACTURING FRICTION MEMBERS OF THE THERMOSETTING RESIN TYPE

[75] Inventors: Kazuyoshi Saiki, Tokyo; Kaneyoshi Nomaguchi, Kamakura; Keiro Yoshizue, Tachibana; Tsutomu Nagoya, Ashigarashimo, all of Japan

[73] Assignees: Sankyo Chemical Industries Ltd.; Tokyo Buhin Kogyo Company Ltd., both of Tokyo, Japan

[22] Filed: Aug. 24, 1973

[21] Appl. No.: 391,325

Related U.S. Application Data

[63] Continuation of Ser. No. 172,564, Aug. 17, 1971, abandoned.

[30] Foreign Application Priority Data

Aug. 31, 1971 Japan.............................. 46-76061

[52] U.S. Cl.............. 260/38, 260/DIG. 39, 260/844
[51] Int. Cl............................................. C08g 51/10
[58] Field of Search...... 260/844, DIG. 39, DIG. 38, 260/51.5; 264/331, 347

[56] References Cited
UNITED STATES PATENTS
2,159,935   5/1939   Sanders....................... 260/DIG. 39
3,014,886   12/1961  Harding............................. 260/844

Primary Examiner—Harry Wong, Jr.
Assistant Examiner—S. L. Fox
Attorney, Agent, or Firm—Flynn & Frishauf

[57]  ABSTRACT

In a method of manufacturing friction members wherein a friction composition containing a phenolic resin is molded under heat and pressure and cured, from about 1 to 100%, by weight based on the weight of the phenolic resin of an acrylamide, is incorporated into the friction compound.

7 Claims, No Drawings

1

METHOD OF MANUFACTURING FRICTION MEMBERS OF THE THERMOSETTING RESIN TYPE

RELATED APPLICATION

This application is a continuation of application Ser. No. 172,564, filed Aug. 17, 1971, which has been abandoned.

BACKGROUND OF THE INVENTION

This invention relates to a method of manufacturing friction members of the thermosetting resin type having improved characteristics.

It has been well known in the art to use friction members of the thermosetting resin type comprising shaped phenolic resin blocks containing asbestos fibres as brake linings or shoes of vehicles. While such friction members are advantageous in many respects when compared with metallic brake members, there are certain problems to be solved. More particularly, the coefficient of friction of such friction members of the thermosetting resin type is reduced greatly when the temperature of the friction surface increases beyond 250°C., thus decreasing the effectiveness of the friction member. Further, at such elevated temperatures, wear of the friction members also increases greatly.

To solve these problems it has been proposed to incorporate a small quantity of a powder of crystals of copper sulfate into the friction members (as disclosed in the Japanese Patent Publication No. 27487/68) but such approach is not always satisfactory.

SUMMARY OF THE INVENTION

It is an object of this invention to provide an improved friction member having a high coefficient of friction and a small wear rate at elevated temperatures, as at 250°C. and 300°C. (Japanese Industrial Standards -JIS-D4411-1960). The invention is based on the discovery that a thermosetting resin type friction member prepared by incorporating an acrylamide into a friction composition containing a phenolic resin scarcely changes its coefficient of friction and rate of wear at such elevated temperatures as described above. It is presumed that this is because the heat resistant property of the phenolic resin used as the binder is enhanced by the addition of an acrylamide.

According to this invention, there is provided a method of manufacturing a friction member of the thermosetting resin type comprising the steps of incorporating in a friction composition containing a phenolic resin about 1 to 100% by weight based on the weight of said phenolic resin, of an acrylamide to form a mixture, molding said mixture under heat and pressure, and curing said mixture.

The friction composition utilized in this invention may be any composition as far as it contains a phenolic resin as the binder. However, a composition comprising asbestos fibres, phenolic resin, cashew resin, a modifier of the friction characteristic, for example graphite, iron, lead, chromium oxide or the like and other additives, is ordinarily preferred. If desired, in addition to asbestos fibres, other strong fibres such as metal fibres, glass fibres, carbon fibres and the like can also be incorporated. The proportion of respective components of the composition can be suitably determined dependent upon the application of the friction members. As the ratio of phenolic resin to asbestos fibres decreases, both coefficient of friction and wear increase. Normally, 40 to 60% of asbestos fibre and 10 to 30% of phenolic resin, both based on the total weight of the composition, are used.

The phenolic resins utilized in this invention involve not only phenol-aldehyde resins but also their modified resins, which are suitable to act as the binders of the friction members. Examples of the phenolic resins are unmodified phenolic resins, modified cresol resins, modified cashew resins, oil modified resins, melamine modified resins, epoxide modified resins, furfural modified resins, allyl modified resins and rubber modified resins.

Among acrylamides may be mentioned derivatives thereof, and homopolymers and copolymers thereof. Typical examples are acrylamide, methacrylamide, N-methyl acrylamide, N-methylmethacrylamide, N-methylolacrylamide, diacetone acrylamide, hydroxymethyl diacetone acrylamide, methylenebisacrylamide, nitrilo-tris-acrylamide, nitrilo-tris-methacrylamide, and their homopolymers and copolymers. The copolymers may also be copolymers of said monomers and unsaturated compounds that are copolymerizable therewith, for example acrylic acid or salts thereof, esters of acrylic acid and acrylonitrile. The quantity of incorporation of these acrylamides is determined in accordance with the field of use of the friction members. Generally, the heat resistant property of a phenolic resin is improved with incorporation of a quantity of the acrylamide to phenolic resin, but an excessive quantity of acrylamide decreases the ability of the phenolic resin as the bonding agent. In order to provide the desired friction characteristics, it is essential to incorprate at least 1%, preferably 10%, and at most 100%, based on the weight of the phenolic resin, of the acrylamide. It was found that use of 10 to 40% by weight gives the best results.

The method of this invention can readily be carried out by mixing, molding under heat and pressure, and curing the composition described above according to the conventional method. Usually, molding is performed under a pressure of about 150 to 200Kg/cm², and at a temperature of about 130° to 200°C., whereas curing is performed at a temperature of about 130° to 200°C. for 3 to 30 hours.

The resulting friction members are worked further when necessary to prepare friction members especially suitable for use as various brake linings or clutch facings for motor cars and the like.

The following specific examples are given by way of illustration, and are not to be construed as limiting in any way the scope and spirit of the invention. All parts are by weight.

EXAMPLE 1

Each of composition I and the control composition as shown in Table 1 was mixed, and each mixture was molded at a temperature of 160°C. and under a pressure of 150Kg/cm². The molded body was then cured at a temperature of 200°C. for 20 hours.

The coefficient of friction and the wear rate of the resulting friction members were measured under a weight of 10Kg/cm² and a slip speed of 7m/sec. according to the specification of JIS-D4411-1960. The results are shown in Table 2.

TABLE 1

|  | Composition I parts | Control parts |
|---|---|---|
| Asbestos fibres | 51 | 55 |
| Cashew modified phenolic resins | 20 | 20 |
| Acrylamide | 5 | — |
| Cashew resin | 10 | 10 |
| Barium salt | 8 | 9 |
| Metal powder (Pb, $Cr_2O_3$) | 6 | 6 |

TABLE 2

| Character-istics | Composition | Temperature °C. | | | | | |
|---|---|---|---|---|---|---|---|
|  |  | 100 | 150 | 200 | 250 | 300 | 100 |
| Coeff. of Friction | Composition I | 0.476 | 0.530 | 0.538 | 0.509 | 0.433 | 0.457 |
|  | Control 1 | 0.439 | 0.532 | 0.490 | 0.404 | 0.361 | 0.429 |
| Wear Rate ($10^{-7} cm^3/kgm$) | Composition I | 0.76 | 1.06 | 1.34 | 1.41 | 3.08 | 1.92 |
|  | Control | 1.27 | 1.27 | 1.49 | 2.30 | 6.30 | 2.05 |

As can be clearly noted from Table 2, the novel friction member has a higher coefficient of friction and a lower wear rate at elevated temperatures than the control not including acrylamide.

EXAMPLE 2

Each of the compositions II and III as shown in Table 3 was mixed, molded under heat and pressure and cured under the same conditions as in Example 1. The coefficient of friction and wear rate of the resulting friction members were determined in the same manner, as in Example 1. When compared with the conventional friction members not containing acrylamide, the coefficient of friction of the novel friction member is higher by about 20%, and the wear rate is lower by about 50%, each at elevated temperatures.

TABLE 3

|  | Composition II parts | Composition III parts |
|---|---|---|
| Asbestos fibres | 53 | 49 |
| Cashew modified phenolic resins | 20 | 19 |
| Acrylamide | 2 | 10 |
| Cashew resin | 10 | 10 |
| Barium salt | 9 | 8 |
| Metal powder (Pb, $Cr_2O_3$) | 6 | 4 |

What is claimed is:

1. A heat-hardenable composition comprising
   a. a thermosetting phenolic resin,
   b. an acrylamide, and
   c. fibres, wherein said acrylamide (b) comprises from about 10 to about 100% by weight of said resin (a), wherein (b) is selected from the group consisting of acrylamide, methacrylamide, N-methyl acrylamide, N-methylmethacrylamide, N-methylolacrylamide, diacetone acrylamide, hydroxymethyl diacetone acrylamide, methylene-bisacrylamide, nitrilo-tris-acrylamide, nitrilo-tris-methacrylamide, homopolymers thereof, and copolymers thereof with acrylic acid, an acrylic acid salt, an acrylic acid ester and acrylonitrile, and wherein said fibres are selected from the group consisting of asbestos fibres, metal fibres, glass fibres and carbon fibres.

2. The composition of claim 1, wherein said acrylamide (b) comprises from about 10 to about 40% by weight of said resin (b).

3. The composition of claim 1, wherein said fibres comprise from about 40 to about 60% by weight of said resin (b) and said resin (b) comprises from about 10 to about 30% by weight of the composition.

4. The composition of claim 1 containing a material selected from the group consisting of graphite, iron, lead and chromium oxide.

5. The composition of claim 1, wherein (b) is acrylamide.

6. A method of improving the coefficient of friction and reducing the wear rate of a heat-hardenable composition comprising a thermosetting phenolic resin and fibres selected from the group consisting of asbestos fibres, metal fibres, glass fibres and carbon fibres, which comprises
   incorporating in said composition from about 10 to about 100% by weight of an acrylamide, based upon the weight of said resin.

7. The method of claim 6, wherein acrylamide is so incorporated.

* * * * *

UNITED STATES PATENT AND TRADEMARK OFFICE
CERTIFICATE OF CORRECTION

PATENT NO. : 3,864,303
DATED : February 4, 1975
INVENTOR(S) : KAZUYOSHI SAIKI et al It is certified that error appears in the above-identified patent and that said Letters Patent are hereby corrected as shown below:

First column, after "[30]":

delete "Aug. 31, 1971   Japan........46-76061"

and replace with:

--- Aug. 30, 1970   Japan............45-76061 ---.

Column 2, line 35: delete "incorprate" and replace with --- incorporate ---.

Signed and Sealed this twenty-fourth Day of February 1976

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,864,303

DATED : February 4, 1975

INVENTOR(S) : KAZUYOSHI SAIKI et al

It is certified that error appears in the above-identified patent and that said Letters Patent are hereby corrected as shown below:

First column, after "[30]":

delete "Aug. 31, 1971    Japan.....46-76061"

and replace with:

---    Aug. 31, 1970    Japan.....45-76061   ---.

Column 2, line 35: delete "incorprate" and replace with --- incorporate ----.

This certificate supersedes Certificates of Correction issued February 24, 1976 and March 23, 1976.

Signed and Sealed this eleventh Day of May 1976

[SEAL]

Attest:

RUTH C. MASON
*Attesting Officer*

C. MARSHALL DANN
*Commissioner of Patents and Trademarks*